United States Patent
Blanchard et al.

(10) Patent No.: US 7,950,030 B2
(45) Date of Patent: May 24, 2011

(54) TV REMOTE CONTROL SIGNAL LOG

(75) Inventors: Robert Blanchard, Escondido, CA (US); Behram Dacosta, San Diego, CA (US); Peter Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 760 days.

(21) Appl. No.: 11/946,322

(22) Filed: Nov. 28, 2007

(65) Prior Publication Data

US 2009/0138903 A1  May 28, 2009

(51) Int. Cl.
H04N 7/16 (2006.01)
H04H 60/32 (2008.01)

(52) U.S. Cl. .......................................... 725/14
(58) Field of Classification Search .............. 725/14, 725/9
See application file for complete search history.

(56) References Cited

U.S. PATENT DOCUMENTS

2004/0031045 A1* 2/2004 Ivanyi .............................. 725/14
2006/0188261 A1* 8/2006 Stevenson et al. ............. 398/115
2007/0183746 A1* 8/2007 Haeuser et al. .................. 386/94
2008/0313665 A1* 12/2008 Francis et al. ................... 725/14

FOREIGN PATENT DOCUMENTS

WO   WO 2005/109883   10/2005

* cited by examiner

Primary Examiner — Scott Beliveau
Assistant Examiner — Bennett Ingvoldstad
(74) Attorney, Agent, or Firm — John L. Rogitz

(57) ABSTRACT

An interceptor detects command signals from a TV remote control and logs the signals. The signals can be correlated not just to channel number but also to programs by accessing a program/channel database. A log of channels/programs that have been viewed by, e.g., a child can thus be obtained and viewed by a parent.

12 Claims, 2 Drawing Sheets

TV REMOTE CONTROL SIGNAL LOG

FIELD OF THE INVENTION

The present invention relates generally to detecting and logging signals from a TV remote control that can later be reviewed.

BACKGROUND OF THE INVENTION

Television filtering devices known as V-chips have been provided that can be used to prevent certain programs from being displayed on a TV. A parent, for example, can instruct the V-chip not to display programs with certain ratings. In this way, a parent can ensure that certain programs will not be viewed by a child when the parent is away.

It will readily be appreciated that V-chips depend on the ratings of programs. These ratings are not assigned by the parent, but rather by the broadcaster or content provider or some other external agency, meaning that all parents in essence are at the mercy of the rating discretion that is exercised by a third party or unknown entity. It happens that many programs which are given normally acceptable ratings, e.g., "general audience" ratings, might in fact be highly objectionable to some parents. Violent cartoons, music shows featuring profane, infantile chants, and the like all might be given ratings that skirt under the levels set by the parents for blocking objectionable content through V-chip or similar blocking technology.

As recognized herein, one way to empower parents to address the above problem is to provide them with a way to review what their child has viewed while alone. As further understood herein, tracking a child's channel selections can be challenging if not impossible with existing TVs.

SUMMARY OF THE INVENTION

An interceptor includes a processor and an infrared interceptor receiver receiving TV channel commands originating from a TV remote control. The receiver communicates the commands to the processor. In response, the processor accesses a database to correlate the commands to TV programs and to generate a log of programs displayed oil a TV, with the log being displayed on an output device.

In some embodiments the processor and receiver are in an interceptor housing that is separate from the TV. Thus, the TV includes a TV wireless command receiver separate from the interceptor receiver. In another embodiment the processor and receiver are in a TV housing, with the processor being implemented by a TV processor and with the receiver being implemented by a TV wireless command receiver. In still other embodiments, the interceptor housing does not implement a set-top box, while in still other embodiments the interceptor housing does implement a set-top box.

If desired, in non-limiting implementations in response to detecting a power on signal originated by the remote control, the processor sends a command to the TV to cause the TV to tune to a predetermined channel. An extender may be provided for receiving IR signals from a TV remote control and relaying the signals in RF to an extender on the interceptor. The extender on the interceptor transforms the signals from RF to IR.

In another aspect, a method for logging television use includes receiving channel change signals from a TV remote control, correlating the channel change signals to TV programs, and displaying a log of the programs to a user. If desired, the log can be displayed only upon input of proper authentication information.

In another aspect, a system includes a TV defining a TV chassis and a remote control configured for sending wireless command signals to the TV. A set-top box communicates with the TV and defines a STB housing. An interceptor is in a housing that can be separate from the TV chassis and set-top box housing and that receives signals from the remote control. The interceptor logs the signals.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
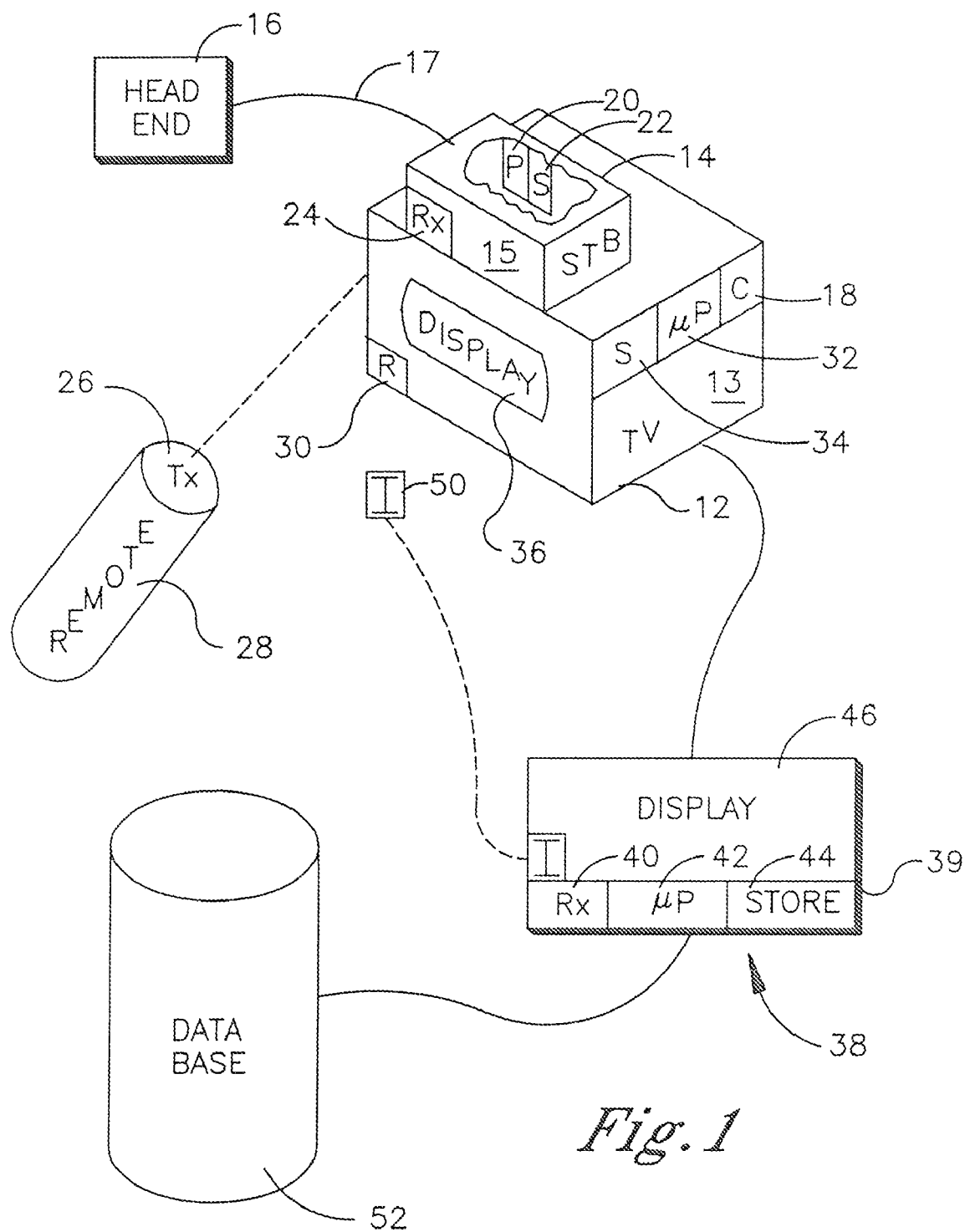
FIG. 1 is a non-limiting hardware block diagram of a system in accordance with present principles, with portions of the STB and TV cutaway for clarity.

Referring initially to FIG. 1, a system is shown, generally designated 10, which includes a television 12 defining a TV chassis 13 and receiving, via a set-top box (STB) 14 defining a STB housing 15, audio video TV programming from a head-end 16, such as a cable or satellite head-end, over a wired or wireless link 17. The STB 14 and TV 12 are examples of receivers. "Set-top box" also includes set-back boxes. While the STB 14 is shown separately housed from the chassis 18 of the TV 12, it is to be understood that the functionality of the STB 14 may be incorporated into the chassis 18.

As shown, the STB 14 includes a STB processor 20 and a computer readable medium 22 such as volatile or non-volatile solid state storage, disk storage, tape storage, or other type of electronic storage medium or logic circuitry that typically can be executed by the processor 20. The STB 14 typically includes a wireless receiver such as an infrared (IR) receiver 24 for receiving channel, volume, and other commands from a hand-held wireless transceiver 26 on a TV remote control 284. The receiver 24 communicates with the STB processor 20. Likewise, a TV wireless receiver 30 may be provided on the TV housing and may communicate with the TV processor discussed below for sending commands from the remote control 28 to the TV processor.

Additionally, as shown the TV 12 typically includes a TV processor 32 and data storage medium 34. Video may be presented on a display 36 of the TV 12, e.g., a flat panel matrix display, cathode ray tube, or other appropriate video display.

A wireless interceptor 38 is shown that includes an interceptor receiver 40 communicating with an interceptor processor 42. The interceptor processor 42 may communicate with an electronic storage medium 44, which can bear data and logic executable by the interceptor processor 42. If desired, a display 46 may be provided on the interceptor 38.

Furthermore, an extender receiver 48 can be provided on the interceptor 38 in non-limiting embodiments, and the extender receiver 48 can communicate wirelessly by, e.g., radiofrequency with an extender 50 that may be physically positioned near, e.g., just in front of, the TV receiver 30 to receive IR command signals, transform them into RF, and send the transformed signals to the extender receiver 48 of the interceptor 38 for conversion back to IR if desired. The process can be reversed between the receiver 48 and extender 50. In any case, this facilitates hiding the interceptor 38 from view of children if desired.

As also shown in FIG. 1, the interceptor 38 may communicate with a database 52 to obtain channel-by-channel program information correlated by time. The database 52 may be accessed over the Internet or it may be stored on, e.g., the TV medium 34 and/or STB medium 22 in electronic program guide (EPG) format.

It is to be understood that the logic shown herein is implemented on one or more of the TV 12, and/or STB 14, and/or interceptor 38. It is to be further understood that the interceptor 38 may be physically integrated with the TV 12 or STB 14, and thus in some implementations the logic set forth below may be executed by the STB processor 20 and/or the TV processor 32, with a physically separate interceptor omitted. It may now be understood that the interceptor 38 may be provided as shown as a standalone device in an interceptor housing 39 that does not require retrofitting of existing TVs and STBs, and thus may not communicate at all with the TV 12. In other embodiments the interceptor 38 may communicate with the TV 12 only for purposes of displaying a channel history on the TV display 36, and in still other embodiments the TV processor 32 and/or STB processor 20 can be programmed to execute the logic set forth below.

Figure 2:
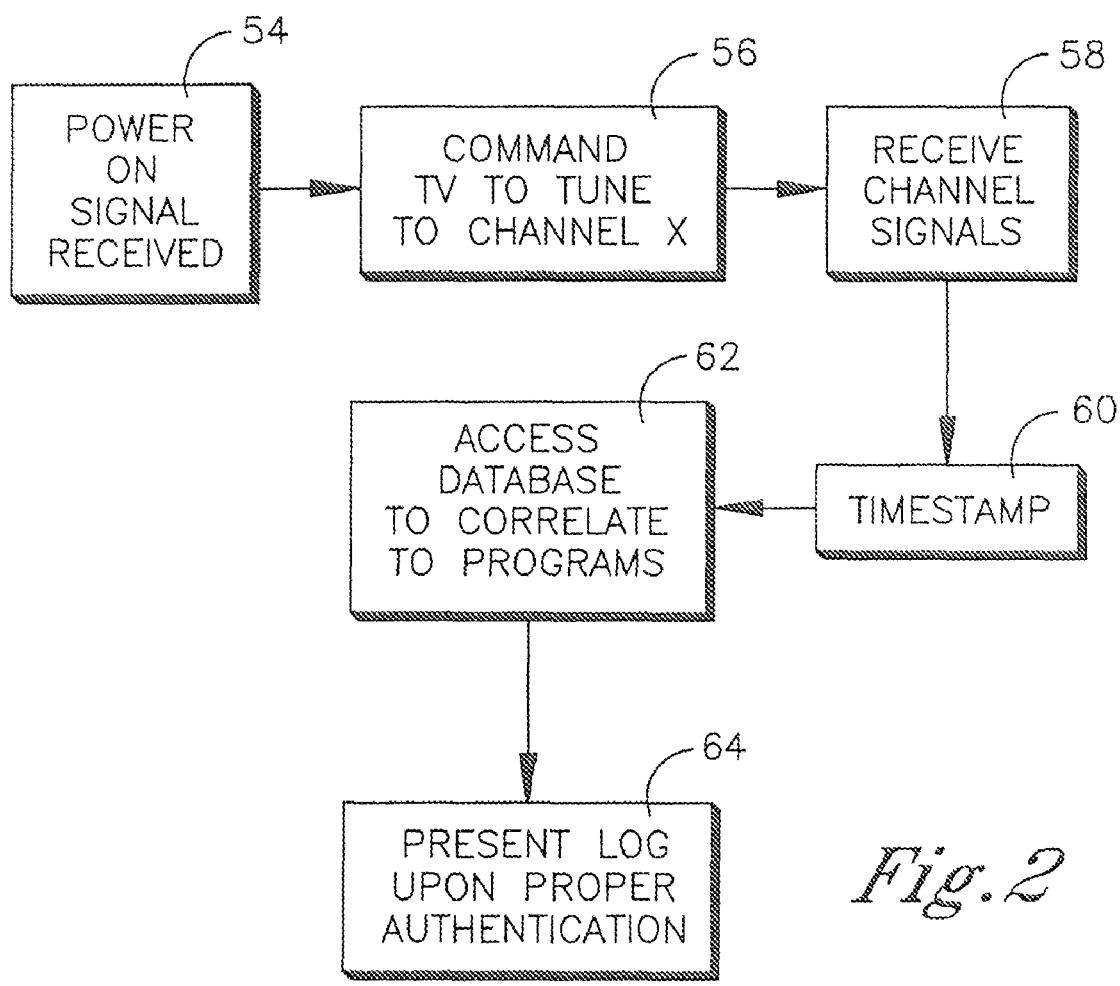
FIG. 2 is a flow chart of non-limiting logic in accordance with present principles.

Turning now to FIG. 2, to synchronize the interceptor 38 with the channel of the TV (or equivalently, when the channel is being controlled by signaling the STB 14, the channel of the STB), when the interceptor detects a power-on signal at block 54 from the remote 28 to the TV 12 (or STB 14), the interceptor 38 commands the TV 12 (or STB 14) to tune to a predetermined channel at block 56. The interceptor 38 may be provided with an IR or RF transmitter for this purpose, as appropriate.

Since the interceptor 38 is now synchronized with the TV 12 (or STB 14) by forcing the TV/STB into a state known to the interceptor 38, all later channel up/down commands snooped from the remote control 28 can be used to ascertain the accessed channel. The interceptor 38 checks whether it has missed a transmission (and hence made an error for the previous log entry) by comparing sequence numbers in the transmitted packets.

For example, if the present sequence number of packets from the remote control 28 that the interceptor 38 has sniffed/snooped from the wireless medium is #4324, and the last sequence number interceptor 38 saw was #4322, then the interceptor 38 can assume it has missed a transmitted command, in which case it may resynch with the TV/STB by repeating the process at block 56. In addition, if the interceptor 38 detects an "acknowledge" packet sent from the TV/STB to the remote control 28 but did not see the packet that is being acknowledged, the interceptor 38 may similarly assume it has missed a packet from the remote control to the TV/STB, and resynchronize accordingly.

If desired, to prevent bypassing the interceptor 38 by manually changing channels using the "channel up/down" buttons on the TV chassis 13 and/or on the STB housing 15, a keyword protected menu option of disabling the "channel up/down" buttons on the TV chassis/STB housing may be provided. Or, the channel up/down buttons on the chassis 13/housing 15 may be mechanically disabled by, e.g., depositing adhesive onto them.

Alternate synchronization methods may be used. For example, in addition to or in lieu of the above, the interceptor 38 may also perform speech recognition on the TV sound, aid then compare the recognized speech to a database containing soundtrack/closed captioned information of the program it thinks is being watched, to confirm that the user is watching the same channel. If a discrepancy exists, the interceptor 38 may either try to resynchronize by finding which program is actually being watched (by comparing speech recognition of TV sound with soundtrack of the channel obtained from a database or closed caption information), or the interceptor 38 may simply force the TV/STB into a known channel by transmitting a "tune to channel x" command to the TV.

Once synchronized, the logic can move to block 58 to receive IR (or RF) wireless channel signals from the remote 28. The channel signals can include channel up/down signals as well as channel number signals. The signals preferably are timestamped at block 60, so that when each channel is tuned to and the length of time it is tuned to, along with the channel number itself, preferably is recorded in a data log.

At block 62, the database 52 preferably is accessed to correlate the channel numbers to associated programs by, e.g., program name and/or rating and/or other program metadata. The log showing the times and channel numbers/programs to which die TV/STB were tuned can be presented at block 64 on, e.g., the TV display 36 or the display 46 of the interceptor 38. The display of the log may be permitted only upon receipt of proper authentication information, e.g. a parental password, so that only authorized people can view the log.

In non-limiting implementations, recognizing that Internet Protocol addresses can be tracked, data from the International Standard Audiovisual Number (ISAN) system, which may be part of the program metadata, can be used to create the log.

In another implementation, the log generated by the interceptor 38 can be provided for a fee to third parties such as TV ratings agencies.

When the present interceptor logic is implemented by the STB 14 (e.g., in a set-back box implementation), tuning data can be obtained using a universal serial bus (USE) link from the TV 12 to the STB 14, and since a broadband connection may also be provided between the two components, the STB 14 can implement the logic of FIG. 2, and also to provide this viewer preference data to third parties if the user chooses.

While the particular TV REMOTE CONTROL SIGNAL LOG is herein shown and described in detail, it is to be understood that the subject matter which is encompassed by the present invention is limited only by the claims.

What is claimed is:

1. An interceptor comprising:
   a processor;
   an infrared interceptor receiver receiving at least TV channel commands originating from a TV remote control, the receiver communicating the commands to the processor, wherein
   the processor accesses a database to correlate the commands to TV programs, the processor generating a log of programs displayed on a TV, wherein the interceptor is synchronized with the TV or set top box (STB) providing TV signals to the TV by, when the interceptor detects a power-on signal to the TV or STB, the interceptor commanding the TV or STB to tune to a predetermined channel such that the interceptor is synchronized with the TV or STB by forcing the TV or STB into a state known to the interceptor, wherein subsequent channel up/down commands snooped from a command signal generator by the interceptor are used to ascertain corresponding channels accessed by means of the channel up/down commands, wherein the interceptor checks whether it has missed a transmission by comparing sequence numbers in transmitted packets from the command signal generator such that responsive to a determination that a sequence number of packets indicates a missing packet, the interceptor resynchronizes with the TV or STB by again commanding the TV or STB to tune to the predetermined channel.

2. The interceptor of claim 1, wherein the processor and receiver are in an interceptor housing separate from the TV, the TV including a TV wireless command receiver separate from the interceptor receiver.

3. The interceptor of claim 1, wherein the processor and receiver are in a TV housing, the processor being implemented by a TV processor and the receiver being implemented by a TV wireless command receiver.

4. The interceptor of claim 2, wherein the interceptor housing does not implement a set-top box.

5. The interceptor of claim 2, wherein the interceptor housing implements a set-top box.

6. The interceptor of claim 1, comprising an extender receiving IR signals from a TV remote control and relaying the signals in RF to an extender on the interceptor, the extender on the interceptor transforming the signals from RF to IR.

7. A method for logging television use, comprising:
receiving, at an interceptor, channel change signals from a TV remote control;
correlating the channel change signals to TV programs; and
displaying a log of the programs to a user, wherein the interceptor is synchronized with a TV or set top box (STB) providing TV signals to the TV by, when the interceptor detects a power-on signal to the TV or STB, the interceptor commanding the TV or STB to tune to a predetermined channel such that the interceptor is synchronized with the TV or STB by forcing the TV or STB into a state known to the interceptor wherein subsequent channel up/down commands snooped from the remote control by the interceptor are used to ascertain corresponding channels accessed by means of the channel up/down commands, wherein responsive to a determination that an "acknowledge" packet sent from the TV or STB to the remote control was responsive to a packet from the command signal generator that was not detected by the interceptor, the interceptor resynchronizes by again commanding the TV or STB to tune to the predetermined channel.

8. The method of claim 7, wherein the log is displayed only upon input of proper authentication information.

9. The method of claim 7, wherein the method is executed by a processor in a TV.

10. The method of claim 7, wherein the method is executed by a processor not in a TV.

11. The method of claim 10, wherein the method is executed by a processor in a set top box.

12. The method of claim 10, wherein the method is executed by a processor not in a set top box.

* * * * *